(12) United States Patent
Jacobson et al.

(10) Patent No.: US 6,250,072 B1
(45) Date of Patent: *Jun. 26, 2001

(54) MULTI-IGNITION CONTROLLABLE SOLID-PROPELLANT GAS GENERATOR

(75) Inventors: Michael D. Jacobson; Gary R. Burgner, both of Ridgecrest, CA (US)

(73) Assignee: Quoin, Inc., Ridgecrest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/346,874

(22) Filed: Jul. 2, 1999

(51) Int. Cl.$^7$ ........................................ F02K 9/06
(52) U.S. Cl. .................. 60/251; 60/207; 60/253; 149/1
(58) Field of Search ............ 60/207, 151, 253; 149/1

(56) References Cited

U.S. PATENT DOCUMENTS

| | | | |
|---|---|---|---|
| 3,065,596 | * 11/1962 | Schultz | 60/207 |
| 3,557,556 | * 1/1971 | Muzzy | 60/207 |
| 3,698,191 | * 10/1972 | Ebling | 60/220 |
| 3,732,693 | * 5/1973 | Chu et al. | 60/207 |
| 3,908,358 | * 9/1975 | Sutton et al. | 60/207 |
| 5,715,675 | * 2/1998 | Smith et al. | 60/251 |
| 5,727,368 | * 3/1998 | Wernimont et al. | 60/207 |
| 6,016,652 | * 1/2000 | Smith et al. | 60/251 |

* cited by examiner

*Primary Examiner*—Edward A. Miller
(74) *Attorney, Agent, or Firm*—Kenneth G. Pritchard

(57) ABSTRACT

Batch-mode and continuous-mode decomposition of nitrous oxide is used to provide multiple ignitions of a solid-propellant gas generator and subsequently control its output gas temperature and flow rate, respectively. To reignite the solid-propellant gas generator, a controlled mass of a reactive oxidizer, such as hot nitrous oxide decomposition products, is injected into the gas generator chamber.

16 Claims, 2 Drawing Sheets

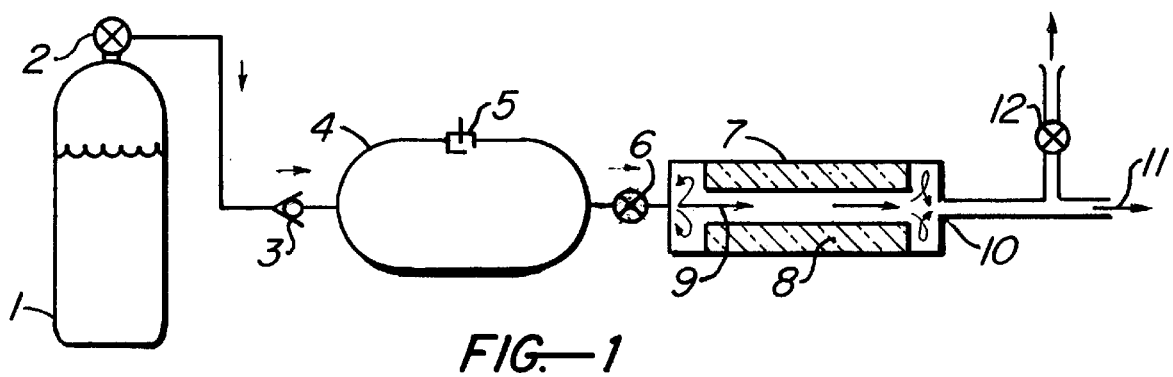
FIG.—1
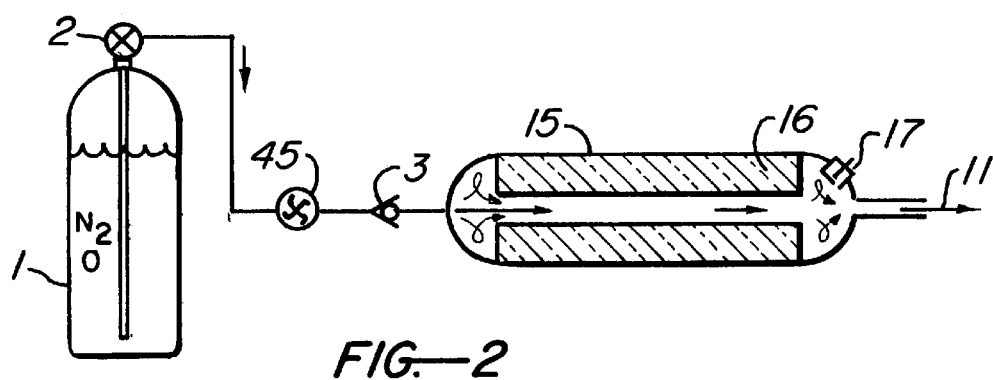
FIG.—2
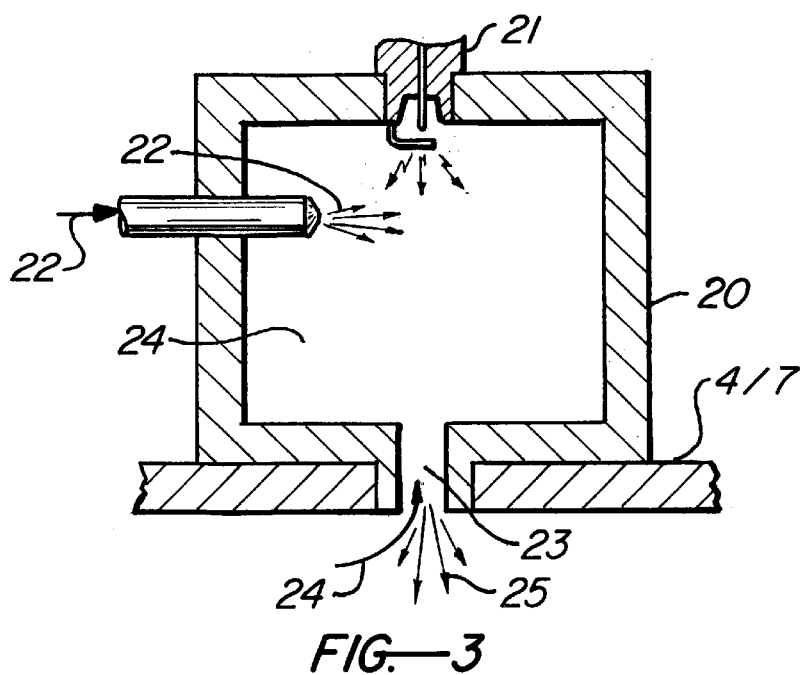
FIG.—3

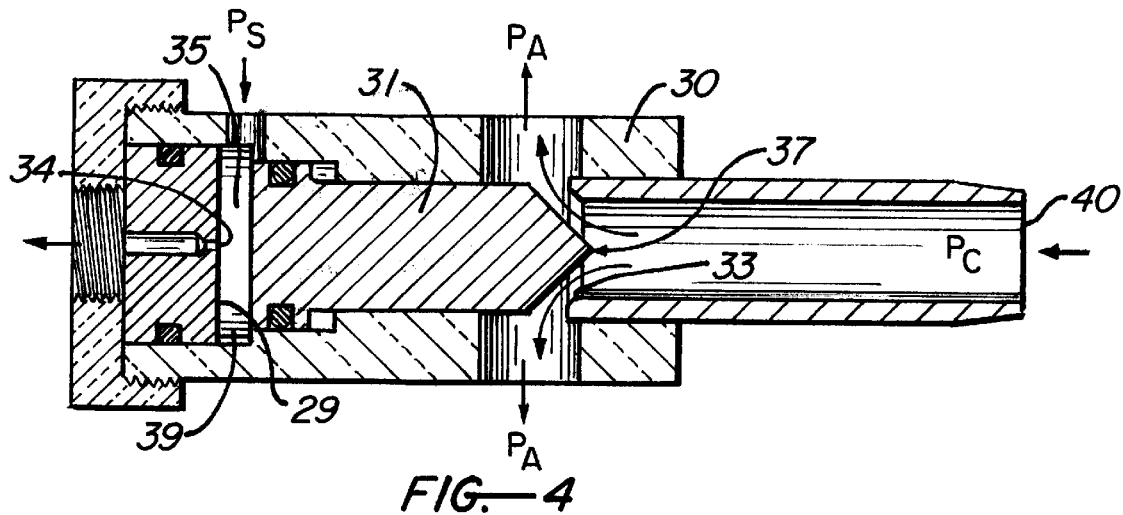
FIG.—4
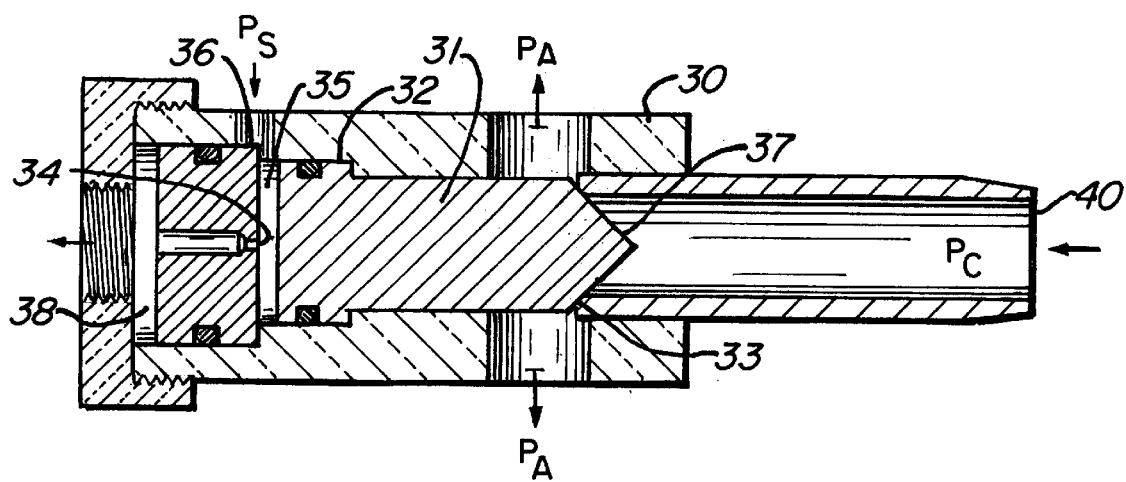
FIG.—5

MULTI-IGNITION CONTROLLABLE SOLID-PROPELLANT GAS GENERATOR

BACKGROUND OF THE INVENTION

Field of the Invention

Solid propellants have numerous advantages over liquids for missile propulsion and as gas generants. Among these are greater safety in storage, handling, and transport, higher density, and simplicity of propellant packaging. Liquids, however, have traditionally offered the huge advantage of ease of throttling and can be extinguished and reignited at will, thereby offering better energy management with minimal waste of on-board propulsive resources.

One application for this invention is in the Divert and Attitude Control Systems (DACS) for kinetic-kill missile warheads. DACS provide for control of vehicles flying outside the earth's atmosphere. Missile DACS typically use solid-propellant gas generators (SPGG) to provide propulsive jets that accelerate and point the vehicle in the vacuum conditions of near-earth space. In the typical existing system, the gas generator is ignited at the start of the control period and continues to burn generally at a measured constant rate for the control duration. This is despite the fact that most of the gas is vented uselessly, because control is needed during only about 30% of the flight. As the flight time increases, the necessary control time remains essentially constant. This means that for longer flight times the wasted fuel increases to over 90%. Matching of the propellant consumption to the control requirement in a DACS could be provided by a multi-ignition, burn-on-command SPGG. This capability would eliminate the biggest single deficiency of solid-propellant systems (controllability after ignition) and would have widespread application potential. The technology involved for gas generators could be extended to most solid-propellant rocket motors as well, resulting in substantial system-level performance benefits.

Some DACS being developed, and other applications for gas generators as well, would benefit from a capability of the gas generator not only to be ignited and extinguished on command, but to have its gas temperature and flow rate controllable. For example, a single, simple gas generator may then be called on to provide turbine drive gases at temperatures around 2000° F., and subsequently provide a greater mass flow of gas at much higher temperatures (3000° F. to 5000° F.) for generating thrust in a rocket nozzle.

In this invention a liquid or gaseous oxidizer is used in relatively small quantities and in novel ways to effect the capabilities discussed above. Nitrous oxide ($N_2O$) is a suitable agent for use in this invention, but other agents may be used successfully within the scope of the invention in similar ways. Pertinent characteristics of nitrous oxide are discussed below.

SUMMARY OF THE INVENTION

This invention describes reactors and techniques to decompose and otherwise use $N_2O$ or similar agents in both batch and continuous flow modes to advance the state of the art of throttleable gas generators for military and commercial use.

In the batch mode, a hot charge of decomposed $N_2O$ (a very hot mixture of oxygen and nitrogen), or other suitable agent, is discharged into a conventional SPGG as an ignition and pressurization source. The gas generator may be repeatedly extinguished and reignited by a new $N_2O$ discharge on command. In this manner, the need for multiple, sequenced, pyrotechnic ignitors mounted in the gas generator is avoided. The $N_2O$ reactor uses a single ignitor, but, most importantly, can produce charges of variable amounts as required to properly pressurize and heat the propellant in an SPGG to effect ignition.

In the continuous mode, the hot, high-pressure products of $N_2O$ decomposition can themselves be useful to drive prime movers, inflate bladders or balloons, etc. Although the invention provides a method of obtaining continuous $N_2O$ decomposition for such uses, it also includes a use of greater interest. That use is as an oxidizer in a hybrid gas generator or rocket motor. In this use $N_2O$ is injected into a gas generator or rocket motor chamber containing a solid fuel or fuel-rich solid propellant grain, and subsequently decomposed to initiate combustion of the grain. After ignition, by varying the flow of $N_2O$ into the process, the temperature of the gases produced and their rate of production can be controlled. If enough $N_2O$ is used, the fuel gases liberated from the solid fuel grain will be completely oxidized and the product gases will generally have temperatures over 5000° F. If the $N_2O$ flow is reduced, the fuel gases will not be completely oxidized and the exhaust temperature will be lower. Exhaust temperature is lower also because the pyrolysis of fuels off the grain surface absorbs heat from the $N_2O$ mixture. Gas temperatures below 2000° F. can probably be produced. The gases thus produced can be put to various uses, depending on their temperature, such as inflation, thrusting from a rocket nozzle, driving pneumatic systems, driving turbines, driving expander prime-movers, extinguishing fires, etc. Conversely, the gas temperature and flow rate can be tailored to the function required at any given time. That is, for example, hot gases in large quantities can be used to produce rocket thrust for a time, then cooler gases can be produced at lower flow rates to drive a turbine, from the same gas generator. The cycle can be repeated as often as needed. Also, with gas generator reignition capability, the gas generator can be turned off and on as necessary, executing even complex duty cycles, as could a bipropellant liquid gas generator.

In both batch and continuous modes of operation, a key element of the invention is a "dump valve" whose purpose is to provide rapid extinguishment of the solid propellant's combustion by rapidly depressurizing the gas generator chamber Moreover, the dump valve can be used repeatedly for multiple ignition/extinguishment cycles. This is in contrast to earlier devices, which provided only one extinguishment. The same dump valve can be configured to regulate the gas generator chamber pressure and resultant exit flow rate.

BRIEF DESCRIPTION OF THE DRAWINGS

FIG. 1 is a schematic of a typical multiple-ignition SPGG using batch-mode injection of decomposed nitrous oxide.

FIG. 2 is a schematic of a typical SPGG whose output gas temperature and flow rate is controlled by continuous injection of nitrous oxide, in addition to being capable of multiple ignitions using batch-mode injection of decomposed nitrous oxide.

FIG. 3 is a schematic of a fuel-enhanced ignition module suitable for substituting for the ignitor in either the batch-mode decomposition reactor or a continuous-flow-mode nitrous oxide-controlled SPGG.

FIG. 4 is a longitudinal cross-section of the dump valve, which can be used in either a conventional SPGG or a continuous-flow-mode nitrous oxide-controlled SPGG.

FIG. 5 is similar to FIG. 4 except the valve is shown in the closed position.

DESCRIPTION OF THE PREFERRED EMBODIMENT

FIG. 1 is a schematic of a typical multiple-ignition SPGG using batch-mode injection of decomposed nitrous oxide. A reactive agent such as liquid $N_2O$ is stored under its own vapor pressure in tank 1. Either liquid or vapor-phase $N_2O$ can be drawn from tank 1 through on-off valve 2, depending on the tank's plumbing configuration. Said $N_2O$ is piped through a check valve 3 into decomposition reactor 4, where a stable vapor-phase state is established. The amount of $N_2O$ contained in reactor 4, and its temperature determine the density and pressure of the charge. Reactor 4 may be temperature-conditioned to obtain a predetermined temperature. The charge is contained at the entry by check valve 3. The charge is contained within the exit end of the reactor by check valve 3, which may be a pressure-relief check valve, whose "cracking pressure" may be set as desired, but is above the stable pressure of the charge in reactor 4. Reactor 4 serves as a decomposition reactor. Charge pressures higher than the vapor pressure of the $N_2O$ in tank 1 can be obtained by loading liquid-phase $N_2O$ into reactor 4, then warming the charge. A pressure relief check valve 6 is used to exhaust the decomposed reactive agent into a solid propellant gas generator 7 also referred to as SPGG 7.

When it is desired to start or restart SPGG 7, a suitable ignitor 5, such as a pyrogen squib, spark plug or hot wire, installed in the wall of reactor 4, is energized, initiating decomposition of the $N_2O$ charge. Decomposition proceeds at a rate dependent on initial charge temperature and pressure, potency of ignitor 5, and other factors. Depending on the initial charge pressure and other factors, the decomposition tends to increase the initial pressure severalfold. When pressure in reactor 4 exceeds the cracking pressure of pressure relief check valve 6, said valve opens, allowing hot gases from reactor 4 to flow at high speed into SPGG 7.

As stated SPGG 7 contains a solid propellant 8 of some conventional grain geometry that is not critical for the proper function of the invention. There are many types of solid propellant 8. For example, it may be a composite type based on ammonium nitrate oxidizer and a hydrocarbon fuel. Solid propellant 8 does not completely fill the internal volume of SPGG 7, some void space being required to allow gases evolved from the grain surface to flow to the exhaust port 10. Hot gases 9 from reactor 4, consisting of a hot mixture of oxygen, nitrogen, and unreacted $N_2O$, flow into the void space within SPGG 7. The rapid filling of the void space in SPGG 7 by hot gases 9 from a high-pressure source combined with the restriction to exhaust flow from exhaust port 10, causes the pressure within SPGG 7 to quickly rise. The high-pressure environment, combined with the heating of the surface of solid propellant 8 by hot gases 9 which also serves as an oxidizing gas, causes the surface of solid propellant 8 to ignite.

The first ignition of solid propellant 8 may be by a traditional pyrotechnic ignitor, shown later in FIG. 2, as ignitor 17, contained in the hollow core of solid propellant 8, or may be accomplished by the nitrous oxide if desired. The ensuing combustion of solid propellant 8 results in evolution of gas from SPGG 7, which maintains its internal pressure at the desired value by virtue of its surface area and the amount of restriction to exhaust flow. Pressure relief check valve 6 closes when SPGG 7 internal pressure increases to a sufficiently high level and the pressure in decomposition reactor 4 drops sufficiently due to exhaustion and cooling of the charge, thereby preventing gases from SPGG 7 from flowing back into reactor 4.

Exhaust gas 11 from SPGG 7 flows either to a dump valve 12 or to a pneumatic load or rocket nozzle. Dump valve 12 can be opened on command to vent exhaust gas 11 to a low-pressure region such as the atmosphere. This causes a sudden decrease in the internal pressure and gas temperature of SPGG 7, extinguishing the ongoing combustion on the surface of solid propellant 8. Sudden depressurization is a well known technique that extinguishes many propellants. Prior technology provided one-time extinguishment of a solid propellant by using a pyrotechnically opened port(s) in the gas generator chamber to suddenly depressurize the grain. Any embodiment of the present invention would include a dump valve that would provide additional exhaust flow area of 5 or more times that of the exhaust orifice required to maintain normal chamber pressure. This dump valve is also capable of automatic or manual closing after an extinguishment so as to restore the normal exhaust flow restriction to the gas generator chamber in preparation of the next ignition. Dump valve design may also provide not only the extinguishment vent but the normal exhaust orifice as well. Dump valve 12 may also operate in an automatic mode, wherein it opens and closes sequentially to maintain some desired average chamber pressure in SPGG 7.

While SPGG 7 is producing gas subsequent to ignition, another $N_2O$ charge can be admitted to reactor 4, in preparation for another ignition cycle. The amount of this charge is controlled to correspond to the void space in SPGG 7 that must be filled and pressurized to the proper extent to successfully execute the next ignition cycle. The proper amount of $N_2O$ charge can be calculated in real time by a computer based on the initial void space in SPGG 7 and, for example, the time integral of chamber pressure, which indicates the amount of propellant consumed.

FIG. 2 is a schematic of a typical SPGG whose output gas temperature and flow rate is controlled by continuous injection of nitrous oxide, in addition to being capable of multiple ignitions using batch-mode injection of decomposed nitrous oxide. This embodiment may be added to the batch-mode embodiment of FIG. 1, or executed without the batch-mode capability, by omitting reactor 4 and pressure relief check valve 6.

In the continuous flow mode, $N_2O$ in the liquid or vapor phase is piped to a continuous-flow decomposition reactor 15 containing a solid fuel or solid propellant, conceptually similar to SPGG 7 of FIG. 1. If the pressure at which exhaust gas 11 must be delivered to the load is above the vapor pressure of the $N_2O$ in tank 1, a pump 45, which may also be an injector, or accumulator-based delivery system may be required, which is not part of this invention, but is a conventional approach. Pump 45 is shown in FIG. 2. Pump 45 is only needed when a significant high pressure feed is desired. Check valve 3 may be installed to prevent backflow of gases from decomposition reactor 15 into the $N_2O$ supply line when the pump is not running or not present.

Liquid or vapor-phase $N_2O$ flows into the "head" end of decomposition reactor 15, which contains a center-perforated (hollow-core) grain 16 consisting of either a solid fuel or fuel-rich solid propellant. Initially, there is no combustion of grain 16 or decomposition of the $N_2O$. Decomposition of the $N_2O$ is initiated by a suitable ignitor 17 installed in the exhaust end of decomposition reactor 15. Ignitor 17 may be an electric ignitor. The initial decomposition reaction raises the chamber pressure from a relatively low value to a value near the design pressure, and by mechanisms described below, the fuel or propellant grain surface is ignited. If the grain consists of fuel only, all the oxidizer is provided by oxygen from the $N_2O$ decomposition and the grain surface regresses from pyrolysis. If the grain consists of a fuel-rich solid propellant, the fuel gases evolved from the surface combust further with the oxygen in the decomposed $N_2O$. The grain surface regresses by the same mechanisms extant in conventional solid-propellant rocket motors and gas generators, hybrid rockets, and solid-fuel ramjets. However, as fresh $N_2O$ is injected into the SPGG chamber head end, its decomposition is initiated and sustained by the continuous heat release near the grain surface, and the whole decomposition/combustion process is self-sustaining. For solid fuel grains, extinguishment occurs when the $N_2O$ (oxidizer) flow is turned off. For solid propellant grains, extinguishment may require supplemental depressurization by venting the chamber via the dump valve described above.

In the case of either solid-fuel or solid-propellant grains, the total mass flow of exhaust gas 11 and the temperature of said gases is controlled by the mass flow of $N_2O$ injected, among other factors. If exhaust gas 11 is fuel-rich, its temperature and mass flow tend to increase if $N_2O$ increases. If the $N_2O$ flow is high enough that exhaust gas 11 is oxidizer-rich, its temperature tends to decrease and its flow rate tends to increase if $N_2O$ increases. The exhaust restriction may have to also be varied to obtain the desired behavior. However, exhaust gas 11 temperatures may be increased by 2000° F. or more by injection of $N_2O$, making exhaust gas 11 more appropriate for rocket-propulsion duty. The benefits of higher mass flow rate and gas temperature available with this invention are completely throttleable and repeatable any number of times until either the solid grain or the $N_2O$ supplies are exhausted.

FIG. 3 shows one possible arrangement of parts to form an enhanced ignition module for initiating decomposition of nitrous oxide or similar oxidizing agent. Such a module could replace the pyrogen squib, spark plug or hot-wire ignitor in either the batch-mode decomposition reactor or the continuous-flow solid-propellant gas generator, providing a more potent means of initiating decomposition. A small reactor pressure vessel 20 is installed in the wall of reactor 4 of FIG. 1 or continuous-flow decomposition reactor 15 of FIG. 2. A conventional ignitor 21, such as pyrogen squib, spark plug or hot-wire, is in turn installed in the wall of said small reactor pressure vessel 20. A fuel injection system 22 injects a fuel such as propane in either liquid or vapor phase into reactor vessel 20, where it mixes with an oxidizer 24 such as nitrous oxide. Oxidizer 24 flows into small reactor pressure vessel 20 through an orifice 23 between small reactor pressure vessel 20 and reactor 4 or decomposition reactor 15, and assumes a similar pressure after a short time. Injected fuel 22 combined with the small amounts of oxidizer 24 in small reactor pressure vessel 20 provides an approximately stoichiometric combustible mixture easily ignited by small amounts of electric energy. Upon ignition, high-temperature exhaust gases 25 are created which exit through orifice 23 into reactor 4 or decomposition reactor 15 and provides more potent initiation of the oxidizer's decomposition than is available with a pyrogen squib, spark plug or hot-wire alone.

FIG. 4 shows another embodiment of the dump valve which can be used in either a conventional SPGG or a continuous-flow-mode nitrous oxide-controlled SPGG. The valve consists of a body 30 with a round central bore into which a round piston/pintle 31 is inserted that can slide between a stop 29 on the left and the pintle seat 33 on the right. When piston/pintle 30 is in the leftmost position, the flow area opened between pintle 37 and pintle seat 33 is approximately 7 times greater than the nominal exhaust gas restriction required to maintain the nominal operating chamber pressure in the SPGG. SPGG exhaust gas is conducted to pintle seat 33 through a suitably large port 40, being at least 2 times the flow area as the pintle-to-pintle-seat maximum area. Piston area 32 is somewhat larger than the area of the pintle seat diameter. Control pressure Ps is continuously applied to cavity 35 and cross hole 39. Cavity 38 can be vented to a low-pressure Pa by a control valve, for example, the solenoid type, not shown. Given the initial condition that cavity 38 is not vented through said control valve, the pressure in cavity 38 is control pressure Ps, which acts on piston area 36. As piston area 36 is larger than piston area 32, which is also acted upon by control pressure Ps, a net force acts on piston/pintle 31 sufficient to move it to the right against SPGG pressure $P_c$ acting on pintle seat area 33, closing the gap between pintle 37 and pintle seat 33 and preventing flow there through. When venting of cavity 40 occurs, the pressure in cavity 40 acting on piston area 36 is essentially reduced to ambient pressure Pa because of the large pressure drop experienced by control gas flowing through cross-hole 35 and orifice 34. The result is that piston/pintle 31 moves to the left, allowing exhaust gas from the SPGG to flow through the pintle seat 33 and around pintle 37 to a low-pressure environment Pa.

Regulation of the SPGG chamber pressure $P_c$ occurs when $P_c$ exceeds the value required to overcome the control pressure Ps acting on piston areas 32 and 36 and seal friction forces, causing piston/pintle 31 to move leftward. As the pintle-to-pintle-seat area opens, SPGG exhaust gas is vented to a low-pressure region, lowering $P_c$. The rate of decay of pressure $P_c$ is controlled in part by pintle opening 38, which may be adjustable by means of a simple screw stop, not shown. Reducing pressure $P_c$ results in a decrease in the rate of evolution of exhaust gas within the SPGG, which effects a further decrease in $P_c$. When $P_c$ reaches a sufficiently low value, control pressure Ps acting on piston areas 32 and 36 overcomes friction forces and the force of $P_c$ acting on pintle 37, causing piston/pintle 31 to move rightward, closing the flow path through which SPGG exhaust gases are vented. The cycle will repeat if $P_c$ again exceeds the "cracking pressure" established by control pressure Ps and the relative areas of piston areas 32 and 36 and the area of pintle seat 33. The action of the vent-regulating valve results in a sawtooth $P_c$ pressure-vs-time history. The variation in pressure between the peaks and valleys in this history depends on several factors, including orifice sizes, piston areas, and seal friction within the valve. The pressure variation can be damped by the addition of features in the valve well known in pneumatics practice to have this effect.

The valve can also be actuated on command to vent the SPGG and extinguish combustion of the propellant therein by allowing the control gas in chamber 40 to vent to a low-pressure region Pa. When the pressure in cavity 38 reaches a sufficiently low pressure still greater than Pa, the force of $P_c$ acting on pintle 37 will overcome the force of control pressure Ps acting on piston area 32 and seal friction forces to move the piston/pintle leftward through stroke 38, opening the pintle-to-pintle seat area and venting $P_c$ to a low-pressure region Pa.

FIG. 5 is the same as FIG. 4 except piston/pintle 31 is to the extreme right in the closed position.

This controllability makes a single solid-propellant gas generator (SPGG) suitable for many functions in a single configuration, including those formerly requiring a two-component (bipropellant) liquid propellant system with its attendant disadvantages. Solid propellants are more stable, less toxic, and do not leak. The solid propellant can be extinguished and reignited a number of times with this invention. The typical means of extinguishment is by rapid depressurization of the gas generator chamber through a large valve, which is a part of the invention. With this invention, the propellant of the gas generator need not be consumed in a single burn, but is metered in response to the needs of the system. The dump valve that is part of this invention can both extinguish the solid propellant and regulate the gas generator output by limiting pressure.

To control the temperature and flow rate of the gases produced by the SPGG, nitrous oxide, or products of its decomposition, is injected into a SPGG chamber containing a solid fuel or fuel-rich solid propellant grain. The oxidizing gas assists in pyrolyzing the solid fuel and reacts with the fuel gases produced to increase the exhaust gas temperature. Exhaust gas temperature increases as nitrous oxide flow increases up to the point where the mixture is approximately stoichiometric. If nitrous oxide flow continues to increase beyond stoichiometric, exhaust temperature falls, but output mass flow continues to increase.

The invention also includes an ignition module that uses the nitrous oxide or similar agent itself, combined with small amounts of injected hydrocarbon fuel in a small reactor, to provide more potent initiation of the oxidizer's decomposition than is available with a pyrogen squib, spark plug or hot-wire alone. However, a conventional pyrogen squib, spark plug or hot-wire ignitor is retained to ignite the fuel-oxidizer mixture in the ignition module, as it offers simplicity and ease of control.

Nitrous oxide ($N_2O$) is a suitable agent for use in this invention, but other agents may be used successfully within the scope of the invention in similar ways. Two principal uses are made of nitrous oxide: as a dental anesthetic ("laughing gas") and as a stable oxidizer to enhance the performance of Ottocycle racing engines. The latter use exploits the ability of $N_2O$ to decompose into molecular nitrogen ($N_2$) and molecular oxygen ($O_2$). Chemically nitrous oxide decomposes as follows:

$2N_2O$ (@room temperature)$\rightarrow 2N_2+O_2+800$ Btu/lbm

Nitrous oxide has well known decomposition characteristics. Its decomposition releases enough heat to raise the temperature of the mixture to about 3500° F. This is about the same temperature attained by stoichiometric mixtures of air and hydrocarbon fuels. Stoichiometric mixtures are those in which the oxidizer present is just enough to consume all the fuel present. Stoichiometric mixtures yield the highest combustion temperatures. Mixtures with excess fuel or oxidizer produce lower temperatures. The oxygen liberated by the $N_2O$ decomposition is then free to combine with carbonaceous fuels present to further raise the temperature and generate carbon dioxide and water vapor.

Nitrous oxide is normally provided in metal storage bottles as a liquid under its own vapor pressure; removal of vapor from the top of the container results in some of the liquid boiling off to repressurize the ullage (vapor cavity). If only the vapor phase will be used, the bottle must be kept upright. Liquid can be tapped if the bottle is upside down. However, problems may ensue: pressure drops in the flow path encourage boiling of the liquid into the vapor phase. Boiling of the liquid absorbs heat from the liquid, the plumbing, valves, regulators, and the bottle itself, so these become very cold. Similarly, vapor-phase nitrous oxide drawn from a bottle will reach extremely low temperatures.

Vapor pressure is a function of the temperature of the liquid, as shown in FIG. 1. The critical temperature is 97.7° F., at which the vapor pressure is 1050 psia; above this temperature, the liquid cannot exist and the bottle will contain only vapor, whose pressure will continue to increase with temperature.

Nitrous oxide, despite being labeled a non-flammable gas, can decompose violently in the vapor phase. Decomposition cannot occur in the liquid. Decomposition produces about 3500° F. gas temperatures and multiplies initial gas pressures by up to 7.7 times in a closed container. If oxidation is also involved, temperatures and pressures can reach much higher values. Decomposition propagation has not been observed in metal plumbing lines smaller than 0.25-inch inside diameter, because of the quenching effect. This behavior strongly suggests that supply lines should have at least one section in which the passages are not greater than 0.25 inch in diameter. This can be achieved by packing larger lines with "quench bundles" of small-diameter tubes. However, violent decomposition is easily provoked in small-diameter tubes under one-half inch by adiabatic compression at closed ends of the tube, where flow stagnates.

Decomposition of $N_2O$ can be ignited by sources at temperatures as low as 1202° F., but the ease of initiation increases with temperature and pressure of the gas. Initiation of decomposition can occur by adiabatic compression, open flame, mechanical or electric sparks, contact with hot surfaces, explosives, or autoignition if the gas gets hot enough. Catalysts, such as carbon and certain organic materials, lower the pressures and temperatures at which decomposition initiates and propagates. It is often difficult to obtain or maintain decomposition in small vessels or lines.

In general, the pressure and temperature of the unreacted gas depends on whether its temperature and/or pressure are increased by the container's restriction of the gas's exit. In a closed bomb, the pressure and temperature will increase fastest and by the greatest amount because none can escape. In open air, as long as the rate of propagation remains well subsonic, unreacted gas will simply move away from the approaching flame front, and its temperature and pressure will not increase much. In between these two extreme conditions are the ones of most interest; that is, in cases where the unreacted gases are flowing through a reactor with a restricted exhaust, or a closed reactor is vented when the pressure reaches a certain value.

The reaction rate is so low at low temperatures that the heat generated is lost to the surroundings (apparently even by radiation to the vessel walls), that the reaction is quenched. However, if the temperature of the gas is raised high enough, the reaction rate becomes high enough that the heat generated exceeds losses to the surroundings, and the reaction "takes off." Given favorable conditions, the rate of reaction can become very high, and a detonation follows.

The dump valve that is part of this invention has two functions, depending on how it is used, to satisfy system needs.

Its first function is to vent the SPGG chamber so that combustion of the propellant grain is extinguished by rapid decompression, a well known technique. A composite solid propellant is a mixture of oxidizer (usually a salt) and fuel (usually a hydrocarbon elastomer). A typical gas-generator propellant consists principally of ammonium nitrate mixed with a thermosetting rubber binder and cast or machined into a grain. Certain surfaces of the grain are intended to burn and recede into the underlying solid propellant, liberating hot exhaust gases. The rate at which the flame front advances into the solid is known as the burning rate rb and is typically an exponential function of the chamber pressure environment $P_c$:

$$r_b = a(P_c)^n,$$

where a is a constant and n is the "burn-rate exponent" or "slope" (approx. 0.5). As suggested by this empirical equation, burning rate usually increases with chamber pressure. Chamber pressure is maintained by forcing the exhaust gases to exit through a restriction (orifice). The exhaust flow rate is given by:

$$\dot{W}_{out} = A_t P_c C_g C^*$$

where $A_t$ is the "throat" (minimum) area of the restriction orifice, $C_g$ is the acceleration due to gravity, and $C^*$ is the speed of sound in the exhaust gas.

If the prevailing restriction is suddenly removed, the exhaust gas flow rate temporarily increases dramatically and the chamber pressure drops accordingly. The reduced chamber pressure causes the propellant burn rate to decrease. Therefore, after this transient, the rate of gas generation tends to stabilize at a lower value. For example, if $A_t$ doubles, the new stable chamber pressure will be approximately one fourth the original pressure, in order to maintain a balance between the flow produced by the propellant and that exhausted through the restriction.

Pressure and temperature of the gases in the chamber are also related by the perfect-gas law:

$$P_c = \rho R T,$$

where $\rho$ is the gas density,

R is the gas constant, and

T is the gas temperature.

If a valve in the chamber wall suddenly opens, allowing the rapid exhausting and expansion of the gases in the chamber, the density, pressure, and temperature of the gases remaining in the chamber are all quickly lowered. In response, the combustion near the propellant burning surface decreases in intensity and moves farther away from the surface. If the chamber evacuation is fast enough and deep enough, combustion of the propellant can usually be extinguished altogether.

The second function of the dump valve is to limit the pressure attained in the SPGG chamber to safe or desired values. It does this by acting as a pressure-relief valve. Instead of staying open long enough to extinguish the grain, the valve closes when a preset reseating pressure is attained in the chamber. The latter feature is used to maintain a predetermined chamber pressure despite changes in gas evolution rate caused by manufacturing variations and grain temperature. For example, common manufacturing tolerances result in chamber pressure variations of 10–20%. Also, propellant burning rate is sensitive to grain temperature, and this effect can result in chamber pressure variations of 20–30%. The combined effects can result in intolerable chamber pressure variations for unregulated gas generators. The dump valve of this invention can regulate the chamber pressure to usable values by controlled venting of the excess gases produced.

What is claimed is:

1. A multi-ignition solid propellant gas generator comprising:

A. a tank of reactive agent,

B. an on-off valve connected to said tank for controlling time periods during which said reactive agent may exit said tank, C. a check valve connected to said on-off valve for preventing back flow such that said reactive agent may only flow from said tank through said check valve, D. a reactor connected to said check valve for decomposition of said reactive agent, E. an ignitor mounted into said reactor such that upon predetermined times said ignitor causes said reactive agent within said reactor to decompose into gas at a predetermined pressure and temperature, F. a pressure relief check valve with a preset cracking pressure operably connected to said reactor such that when the pressure in said reactor exceeds the cracking pressure of said pressure relief check valve gas flows from said reactor through said pressure relief valve, G. a gas generator connected to said pressure relief check valve such that gas vented from said pressure relief check valve enters into said gas generator, H. solid propellant placed within said gas generator which generates predetermined thrust when said gas from said reactor flows into said gas generator through said pressure relief check valve, I. an exhaust port operably connected to said gas generator for directing thrust in a predetermined direction, and J. a dump valve operably connected to said exhaust port for quickly increasing the effective opening of said exhaust port such that a sudden decrease of the internal pressure of said gas generator adequate to extinguish said solid propellant.

2. A multi-ignition solid propellant gas generator as described in claim 1 wherein said reactive agent comprises nitrous oxide, $N_2O$.

3. A multi-ignition solid propellant gas generator as described in claim 1 where said solid propellant comprises a composite of ammonium nitrate oxidizer and a hydrocarbon fuel.

4. A multi-ignition solid propellant gas generator as described in claim 2 where said solid propellant comprises a composite of ammonium nitrate oxidizer and a hydrocarbon fuel.

5. A multi-ignition solid propellant gas generator as claimed in claim 1 further comprising a pyrotechnic ignitor mounted within said solid propellant for initial ignition of said solid propellant.

6. A multi-ignition solid propellant gas generator as claimed in claim 2 further comprising a pyrotechnic ignitor mounted within said solid propellant for initial ignition of said solid propellant.

7. A multi-ignition solid propellant gas generator as claimed in claim 3 further comprising a pyrotechnic ignitor mounted within said solid propellant for initial ignition of said solid propellant.

8. A multi-ignition solid propellant gas generator as claimed in claim 4 further comprising a pyrotechnic ignitor mounted within said solid propellant for initial ignition of said solid propellant.

9. A multi-ignition solid propellant gas generator as described in claim 1 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

10. A multi-ignition solid propellant gas generator as described in claim 2 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

11. A multi-ignition solid propellant gas generator as described in claim 3 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

12. A multi-ignition solid propellant gas generator as described in claim 4 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

13. A multi-ignition solid propellant gas generator as described in claim 5 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

14. A multi-ignition solid propellant gas generator as described in claim 6 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

15. A multi-ignition solid propellant gas generator as described in claim 7 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

16. A multi-ignition solid propellant gas generator as described in claim 8 where said ignitor mounted into said reactor further comprises:

A. a reactor pressure vessel mounted in the wall of said reactor,

B. a pyrotechnic ignitor operably mounted into the inner wall of said reactor pressure vessel, and C. fuel injection means connected to said reactor pressure vessel so that fuel is injected into said reactor pressure vessel.

* * * * *